United States Patent [19]

Jackson

[11] Patent Number: 4,763,169
[45] Date of Patent: Aug. 9, 1988

[54] PHOTOGRAPHIC OPTICAL BENCH

[76] Inventor: Sidney G. Jackson, 54 Avenue Road, Erith, Kent DA8 3AS, England

[21] Appl. No.: 79,176

[22] Filed: Jul. 29, 1987

[30] Foreign Application Priority Data

Aug. 6, 1986 [GB] United Kingdom ............... 8619211

[51] Int. Cl.$^4$ .............................................. G03B 27/52
[52] U.S. Cl. .......................................... 355/30; 355/52
[58] Field of Search .............................. 355/30, 52, 46

[56] References Cited

U.S. PATENT DOCUMENTS 3,273,451  9/1966  Wilson ................... 355/30
3,614,223 10/1971  Ott ......................... 355/30
3,893,763  7/1975  Ott ......................... 355/30

Primary Examiner—Monroe H. Hayes
Attorney, Agent, or Firm—Jeffers, Hoffman & Niewyk

[57] ABSTRACT

A photographic optical bench includes a pulsed source of illumination (1) and an aspheric condenser (2). Color filters (21) and corresponding apertures (22) are positioned between the pulsed source (1) and the condenser (2). The apertures (22) have different spacings so that when a particular aperture (22) is in the optical path it forms an apparent object for light of a particular color such that the light passes through a focal point (25) common to all colors. A tank (3) located between the condenser (2) and the focal point (25) holds a transparent photographic medium and a refractive index matching liquid. In use an image of the transparent photographic medium is formed on a second photographic medium in a camera (5) having an imaging lens (6) at the common focal point (25).

14 Claims, 3 Drawing Sheets

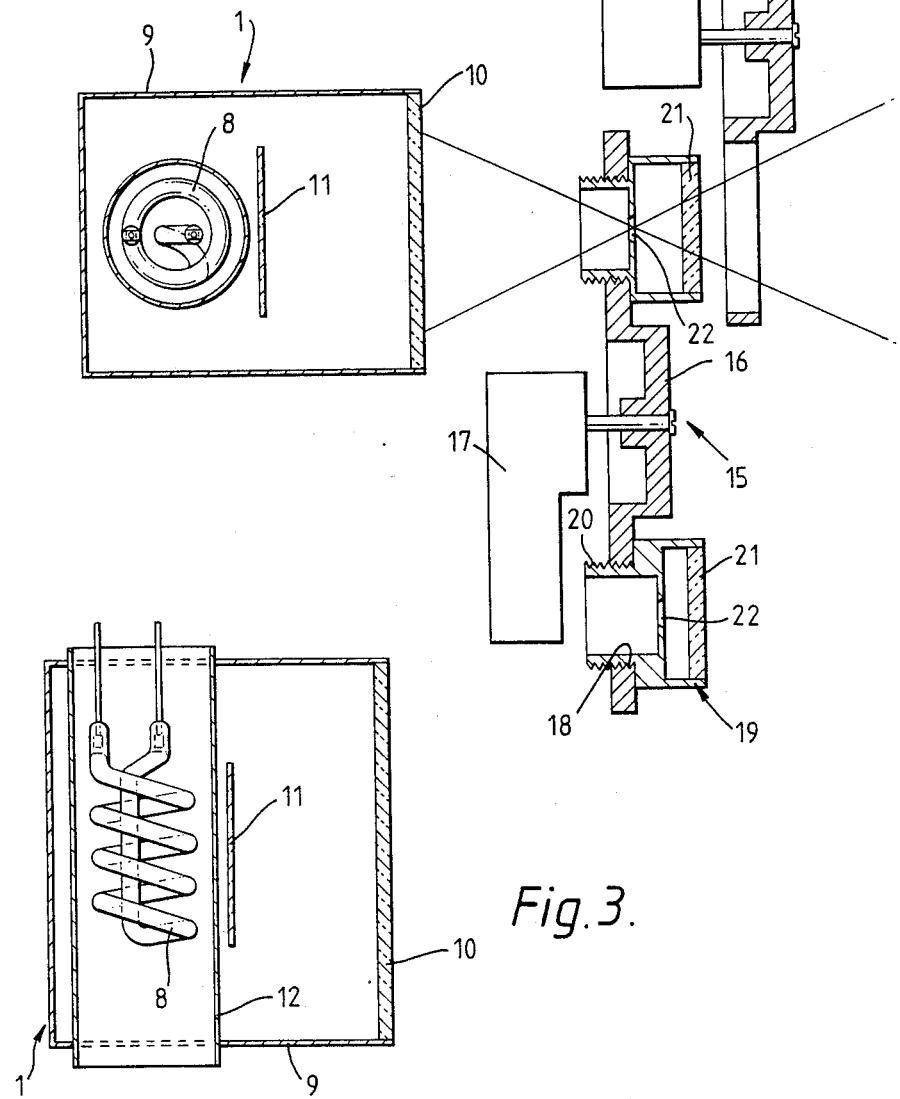

PHOTOGRAPHIC OPTICAL BENCH

BACKGROUND OF THE INVENTION

This invention relates to a photographic optical bench that is used for transferring an image from a transparent photographic medium such as a negative, or transparency to a secondary photographic medium to be exposed. The secondary photographic medium may be a photosensitive paper to produce a print of the negative or transparency, may be a photographic film to produce another transparency, an internegative, or a single colour separation from a multicolour negative or transparency. The image on the secondary photographic medium may be of the same size when, for example, duplicating the transparent photographic medium or it may be enlarged or reduced in size.

When a transparent photographic medium is illuminated by a condenser lens system any imperfections such as scratches on the film stock, dust, and even the grain structure of the photographic emulsion are brought into sharp focus on the secondary photographic medium. Thus, to avoid this degradation in the image quality on the second photographic medium a diffuse light source is normally used to illuminate the transparent photographic medium. This results in an overall loss of sharpness and definition in the image formed on the secondary photographic medium but this is usually considered preferable. Conventional photographic benches usually use a continuous source of illumination such as a tungsten halogen bulb located behind a diffusing screen to illuminate the transparent photographic medium with light scattered from the diffusing screen. Usually provision is made for introducing one or more differently coloured filters into the optical path to enable the secondary photographic medium to be exposed to the image carried by the transparent photographic medium with light of different colour.

SUMMARY OF THE INVENTION

A photographic optical bench comprising a pulsed source of illumination an aspheric lens condenser system, a number of filters located in the optical path of the optical bench to transmit light of different colours, a corresponding number of apertures located between the pulsed source of illumination and condenser system to provide an apparent object for the condenser system, the number of apertures having different spacings from the condenser system, means to move the apertures and the filters into and out of an optical path of the condenser system so that a particular aperture forms an apparent object for light of a particular colour to ensure that light of all colours pass through a common focal point on the downstream side of the condenser system, the different spacing between the apertures and the condenser system thereby compensating for chromatic aberrations in the condenser system, a tank to hold a transparent photographic medium and refractive index matching liquid located between the condenser system and the common focal point, and a camera including an imaging lens system having its optical centre located at the common focal point and support means to support a secondary photographic medium to be exposed downstream of the imaging lens and on which, in use, an image of the transparent photographic medium is formed, the size of the number of apertures being matched to that of the aperture of the imaging lens so that the diameter of the light beam passing through the optical centre of the imaging lens falls within its aperture.

With an optical bench in accordance with this invention the use of aspheric lenses in the condenser system eliminates spherical aberrations and the matching of the spacing between the number of apertures and the condenser lens system with the focal length of the system for light of particular wavelengths avoids chromatic aberration in the condensing system. Thus, the condenser lens system is substantially free of all forms of aberration.

The use of a pulsed light source cooperates with the secondary photographic medium to provide an illumination system which does not result in the burning out of highlights in the image of the transparent photographic medium whilst, at the same time, ensuring that sufficient definition is provided in its shadow areas. This results in substantially no degradation of the image during its transfer from the transparent to the secondary photographic medium.

Further, since the transparent photographic medium is suspended in a tank which, in use, contains an index matching liquid any imperfections resulting from latent defects in the surface of a film stock or subsequent minor scratches produced during its coating with photosensitive material, the development of the photosensitive material or its subsequent handling are effectively "filled in" by the refractive index matching liquid and so do not appear in the image formed on the secondary photographic medium in spite of the use of a condenser illumination system. Further, since the transparent photographic medium is suspended in a tank containing the refractive index matching liquid dust particles adhered to the surface of the photographic medium tend to be washed off and released from the surface of the photographic medium and fall to the base of the tank so removing a further potential source of imperfection. The fluid may be circulated and drawn through a filter to remove the dust. The circulation also tends to move any dust in the liquid at the time of the exposure with sufficient speed that it is too blurred to register on the secondary photographic medium.

Preferably the pulsed light source comprises a flash tube such as a xenon flash tube located within an integrating enclosure with a reflector arranged to block direct illumination of the aperture by the flash tube, and an opaque diffusing screen located between the integrating enclosure and the apertures. A series of neutral density filters may also be provided to match the illumination required to expose the particular secondary photographic medium to be used taking account of the characteristics of the transparent photographic medium.

Preferably the differently coloured transmission filters and apertures are mounted together around a circular filter wheel which includes means to index it to bring a particular coloured filter and aperture combination into the optical path of the optical bench at any particular instant. When the optical bench includes the neutral density filters preferably these are arranged around the periphery of a second filter wheel which again includes means to index it into a predetermined position. Typically the apertures are circular and have a diameter of substantially 4 mm to 9 mm.

BRIEF DESCRIPTION OF THE DRAWINGS

A particular example of an optical bench in accordance with this invention will now be described with reference to the accompanying drawings, in which:

FIG. 2 is a lateral section through the light source and filter wheel arrangement;

FIG. 3 is a cross section through the light source; and,

DESCRIPTION OF PREFERRED EXAMPLE

Figure 1:
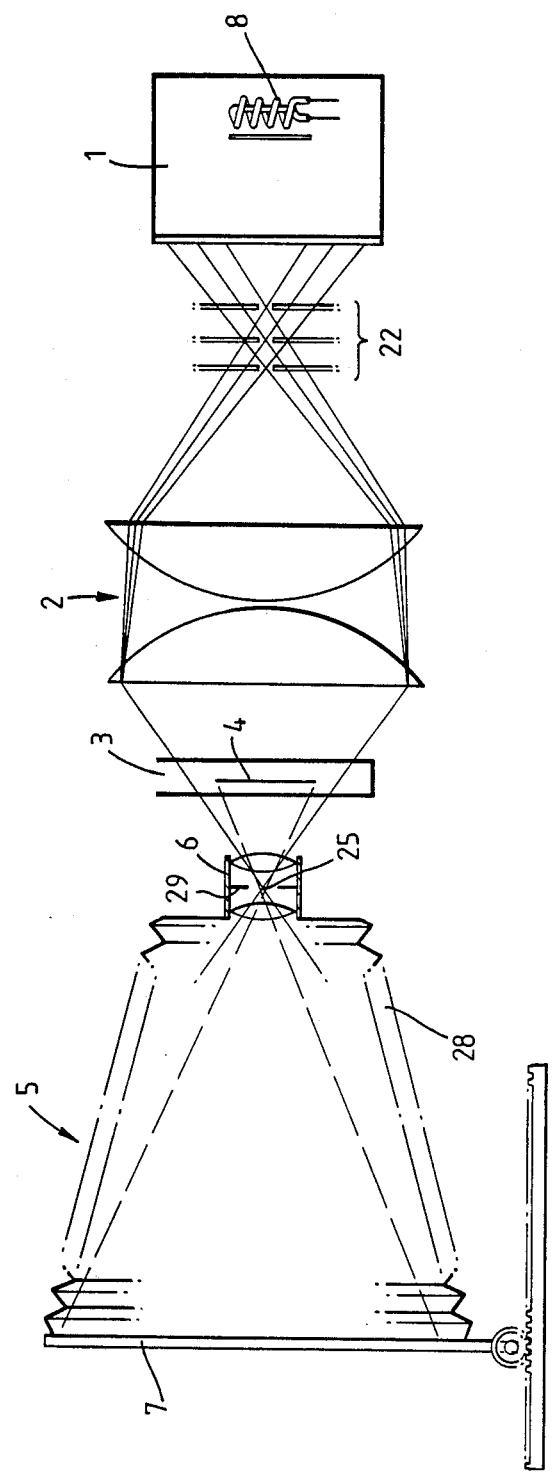
FIG. 1 is an optical diagram of the optical bench.
Figure 4:
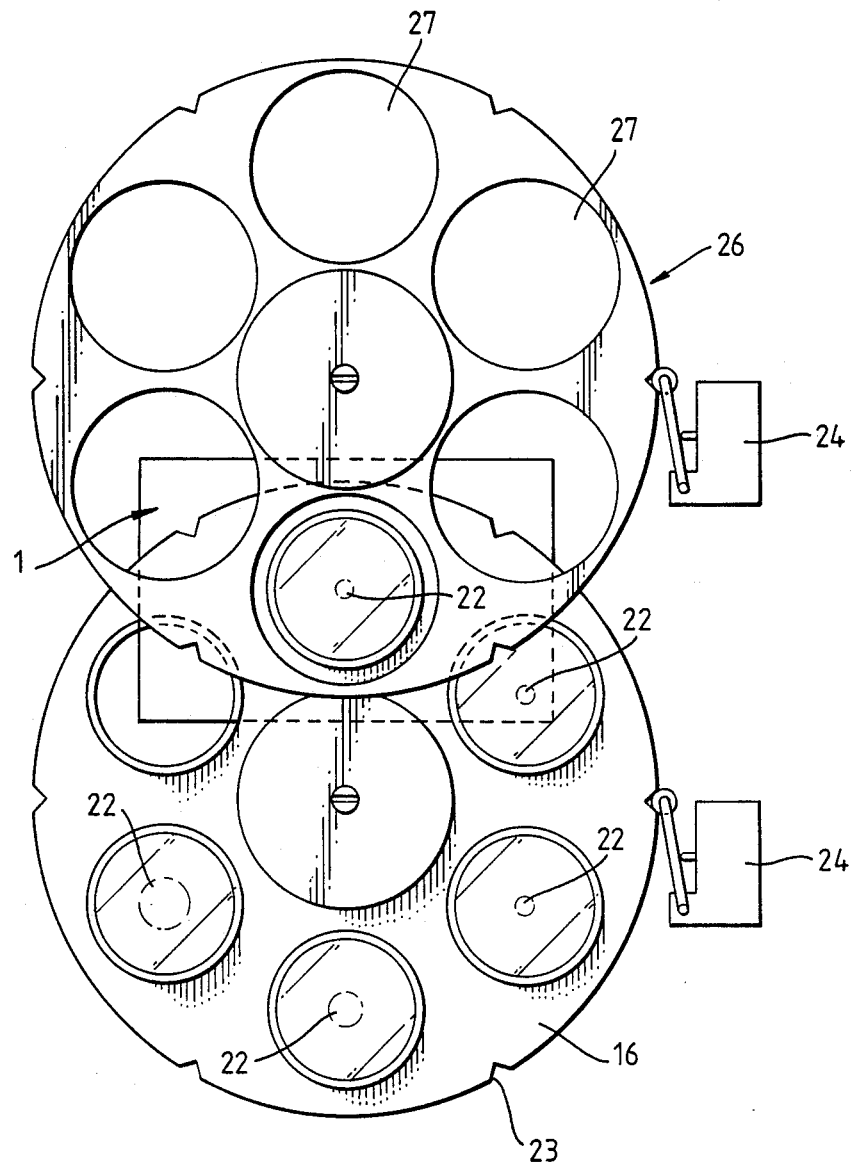
FIG. 4 is a front elevation of the filter wheel assembly.

The optical bench comprises a light source 1 an aspheric condenser lens system 2, a tank 3 for containing a transparency or negative 4, and a camera 5 including an imaging lens 6 and a support for a secondary photographic medium 7. The light source 1 comprises a xenon flash tube 8 mounted in an integrating enclosure formed by the illuminised inside surface of a housing 9. The housing includes a diffuser 10 formed by opal glass and a reflecting baffle 11 to prevent light from the xenon flash tube 8 directly impinging upon the diffusing glass 10. The xenon flash tube 8 is mounted in a circular transparent tube 12 through which a supply of cooling air is provided and driven by an electronic circuit (not shown) to have a flash duration of 1/5000th sec.

A first filter wheel assembly 15 comprises a filter wheel 16 mounted for rotation upon the drive shaft of a motor 17. Around the periphery of the wheel 16 are a number of screw threaded apertures 18. Colour filter assemblies 19 having a corresponding male screw threaded portion 20 are screwed into the apertures 18 and contain colour filters 21 and apertures 22. The wheel 16 also includes indexing notches 23 around its periphery and a microswitch 24 having a roller which engages with the notches 23 and interrupts the drive of the motor 17 to locate the desired colour filter assembly 19 in the optical path of the optical bench between the light source 1 and the condenser lens system 2. The apertures 22 are each located at a different distance from the condenser lens system 2. Thus, as the filter wheel is indexed around the aparent source of illumination for the condenser lens system moves closer to or further away from the condenser lens system. The spacing of the apertures 22 from the condenser lens system 2 is such that for light transmitted by the particular colour filter 21 associated with each aperture 22 the condenser lens system always focusses the light through a common focal point 25. FIG. 1 illustrates diagrammatically the location of the apertures 22 for blue, green and red light. In this way chromatic aberrations of the condenser system 2 are accommodated since, the effective position of the light source is moved for light of different colour.

A second filter wheel assembly 26 which is similar in design and construction to the filter wheel assembly 15 is placed downstream of the filter wheel 15 and includes a number of neutral density filters 27. The different neutral density filters 27 are accommodated in the optical path of the optical bench to take account of the sensitivity of the secondary photographic medium located in the camera 5 and to take into account the density of the transparency or negative 4. The arrangement for selecting the appropriate neutral density filter 27 in accordance with these factors is conventional.

The tank 3 includes optically flat sides and is filled with a liquid the refractive index of which is similar to that of the substrate of the transparent photographic medium. Pure turpentine has a refractive index which is generally similar to that of conventional film stock and does not in any way damage the transparency or colour negative. Accordingly this is the preferred index matching liquid. When the transparency or negative is immersed in the index matching liquid in the tank 3 scratches and imperfections on its surface including those generated by the three dimensional surface structure of the photographic emulsion are no longer visible since the index matching liquid "fills in" these inperfections in the surface structure of the negative and prevents them scattering light or interfering with it. Thus, it is only the different intensities and colours of the photographic emulsion that are imaged by the imaging lens 6 onto the secondary photographic medium.

A small portion of light passing through, for example, highlights on a transparency 4 and being scattered by them is reflected from the downstream plane face of the tank 3 and is returned to illuminate the surface of the transparency 4. This assists in bringing out the detail in the shadows of the transparency so further enhancing the gradation of the image formed on the secondary photographic medium.

The camera 5 typically includes a bellow 28 and means to move the support 7 for the secondary photographic medium backwards and forwards with respect to the imaging lens 6. The imaging lens 6 is arranged with its optical centre at the common focus point 25 of the condenser lens system 2. The tank 3 is also arranged to be moved twards and away from the imaging lens 6. Though both of these movements not only can the image on the secondary photographic medium be brought into sharp focus, also the size of the image can be enlarged or reduced as required.

The imaging lens 6 is typically formed by a conventional camera lens which includes an iris diaphragm 29. The diameter of the apertures 22 is selected to be the same as or smaller than the normal working aperture of the diaphragm 29 so that the light at the common focus point 25 does not impinge upon the blades of the iris diaphragm 29. By ensuring that the common focal point falls wholly within the aperture of the imaging lens 6 no refraction takes place at the periphery of the iris diaphragm 29 and this further enhances the quality and sharpness of the image formed on the secondary photographic medium.

I claim:

1. A photographic optical bench comprising a pulsed source of illumination (1), an aspheric lens condenser system (2), a number of filters (21) located in the optical path of said optical bench and arranged to transmit light of different colours, a corresponding number of apertures (22) located between said pulsed source of illumination (1) and condenser system (2) and adapted to provide an apparent object for said condenser system (2), said number of apertures (22) having different spacings from said condenser system (2), means to move said apertures (22) and said filters (21) into and out of an optical path of said condenser system (2) so that a particular aperture (22) forms an apparent object for light of a particular colour at a distance from said condenser such that light of all colours pass through a common focal point (25) on a downstream side of said condenser system (2), said different spacings between said apertures (22) and said condenser system (2) thereby compensating for chromatic aberrations in said condenser system (2), a tank (3) adapted to hold a transparent photographic medium and refractive index matching liquid located between said condenser system (2) and said common focal point (25), and a camera (5) including an imaging lens system (6) having its optical centre located at said common focal point (25) and support means (7) to support a secondary photographic medium to be exposed downstream of said imaging lens (6) and on which, in use, an image of said transparent photographic medium is formed, said size of said number of apertures (22) being matched to that of said aperture of said imaging lens (6) so that said diameter of a light beam passing through said optical centre of said imaging lens (6) falls within its aperture.

2. A photographic optical bench according to claim 1, in which said pulsed source of illumination (1) comprises an integrating enclosure (9), a flash tube (8) located within said integrating enclosure (9), a reflector (11) arranged to block direct illumination of said apertures (22) by said flash tube (18), and an opaque diffusing screen (10) located between said integrating enclosure (9) and said apertures (22).

3. A photographic optical bench according to claim 2, including a first filter wheel (16) and means to index said first filter wheel (16), said differently coloured transmission filters (21) and apertures (22) being mounted together around said first filter wheel (16) and said means to index said first filter wheel (16) bringing a particular coloured filter (21) and aperture (22) combination into said optical path of said optical bench at any particular instant.

4. A photographic optical bench according to claim 3, in which said means to index said first filter wheel (16) include a motor (17) arranged to drive said filter wheel (16), indexing notches (23) formed around the periphery of said filter wheel (16), a microswitch (24) and a roller connected to said microswitch (24) which engages said notches (23) and interrupts said drive of said motor (17) to locate said particular filter (21) and aperture (22) combination in said optical path.

5. A photographic optical bench according to claim 4 including neutral density filters (27), a second filter wheel (26) and means to index said second filter wheel (26), said neutral density filters (27) being arranged around said periphery of said second filter wheel (26) and said means to index said second filter wheel (26) bringing a particular neutral density filter (27) into said optical path of said optical bench.

6. A photographic optical bench according to claim 5, in which said means to index said second filter wheel (26) include a motor (17) arranged to drive said filter wheel (16), indexing notches (23) formed around said periphery of said filter wheel (26), a microswitch (24) and a roller connected to said microswitch (24) which engages said notches (23) and interrupts said drive of said motor (17) to locate said particular neutral density filter (27) in said optical path.

7. A photographic optical bench according to claim 2 including neutral density filters (27), a filter wheel (26) and means to index said filter wheel (26), said neutral density filters (27) being arranged around said periphery of said filter wheel (26) and said means to index said filter wheel (26) bringing a particular neutral density filter (27) into said optical path of said optical bench.

8. A photographic optical bench according to claim 7, in which said means to index said second filter wheel (26) include a motor (17) arranged to drive said filter wheel (16), indexing notches (23) formed around said periphery of said filter wheel (26), a microswitch (24) and a roller connected to said microswitch (24) which engages said notches (23) and interrupts said drive of said motor (17) to locate said particular neutral density filter (27) in said optical path.

9. A photographic optical bench according to claim 1, including a first filter wheel (16) and means to index said first filter wheel (16), said differently coloured transmission filters (21) and apertures (22) being mounted together around said first filter wheel (16) and said means to index said first filter wheel (16) bringing a particular coloured filter (21) and aperture (22) combination into said optical path of said optical bench at any particular instant.

10. A photographic optical bench according to claim 9, in which said means to index said first filter wheel (16) include a motor (17) arranged to drive said filter wheel (16), indexing notches (23) formed around the periphery of said filter wheel (16), a microswitch (24) and a roller connected to said microswitch (24) which engages said notches (23) and interrupts said drive of said motor (17) to locate said particular filter (21) and aperture (22) combination in said optical path.

11. A photographic optical bench according to claim 10 including neutral density filters (27), a second filter wheel (26) and means to index said second filter wheel (26), said neutral density filters (27) being arranged around said periphery of said second filter wheel (26) and said means to index said second filter wheel (26) bringing a particular neutral density filter (27) into said optical path of said optical bench.

12. A photographic optical bench according to claim 11, in which said means to index said second filter wheel (26) include a motor (17) arranged to drive said filter wheel (26), indexing notches (23) formed around said periphery of said filter wheel (26), a microswitch (24) and a roller connected to said microswitch (24) which engages said notches (23) and interrupts said drive of said motor (17) to locate said particular neutral density filter (27) in said optical path.

13. A photographic optical bench according to claim 1, including neutral density filters (27), a filter wheel (26) and means to index said filter wheel (26), said neutral density filters (27) being arranged around said periphery of said second filter wheel (26) and said means to index said second filter wheel (26) bringing a particular neutral density filter (27) into said optical path of said optical bench.

14. A photographic optical bench according to claim 13, in which said means to index said second filter wheel (26) include a motor (17) arranged to drive said filter wheel (26), indexing notches (23) formed around said periphery of said filter wheel (26), a microswitch (24) and a roller connected to said microswitch (24) which engages said notches (23) and interrupts said drive of said motor (17) to locate said particular neutral density filter (27) in said optical path.

* * * * *